United States Patent [19]

Mattelin et al.

[11] Patent Number: 4,678,289

[45] Date of Patent: Jul. 7, 1987

[54] APPARATUS FOR THE DEFLECTION OF A LIGHT BEAM

[75] Inventors: Antoon Mattelin, Oostkamp; Bert Paquet, Opwijk, both of Belgium

[73] Assignee: Siemens Aktiengesellschaft, Berlin and Munich, Fed. Rep. of Germany

[21] Appl. No.: 775,349

[22] Filed: Sep. 12, 1985

[30] Foreign Application Priority Data

Sep. 25, 1984 [DE] Fed. Rep. of Germany ....... 3435167

[51] Int. Cl.$^4$ ............................................. G02B 26/08
[52] U.S. Cl. ................................................... 350/486
[58] Field of Search .......................... 350/6.5, 6.6, 6.91, 350/486, 636, 637

[56] References Cited

U.S. PATENT DOCUMENTS

| | | | |
|---|---|---|---|
| 2,724,310 | 11/1955 | Paine | 350/486 |
| 3,060,755 | 10/1962 | De Brosse et al. | 350/6.91 |
| 3,848,104 | 11/1974 | Locke | |
| 3,902,036 | 8/1975 | Zaleckas | |
| 3,914,029 | 10/1975 | Hoplock | 350/636 |
| 4,270,845 | 6/1981 | Takizawa et al. | 350/636 |

Primary Examiner—John K. Corbin
Assistant Examiner—Vincent J. Lemmo
Attorney, Agent, or Firm—Hill, Van Santen, Steadman & Simpson

[57] ABSTRACT

The deflection of a light beam in two mutually perpendicular directions ensues by rotating two spindles which are hinged to a single deflection mirror and whose axes reside perpendicular to one another. The first spindle is hinged to the deflection mirror via a fork joint such that the trunnion axis of said fork joint and the axis of the first spindle are perpendicular to one another. The second spindle is hinged to the deflection mirror via a turning arm and a dog secured to the backside of the deflection mirror. So that the two spindles can be turned independently of one another, the dog is guided in the turning arm so as to be freely pivotable around the axis of the first spindle. The dog is preferably guided in a slot of the turning arm. Apparatus equipped with only a single deflection mirror for the deflection of a light beam in two mutually perpendicular directions are usefully employed in laser labeling.

19 Claims, 7 Drawing Figures

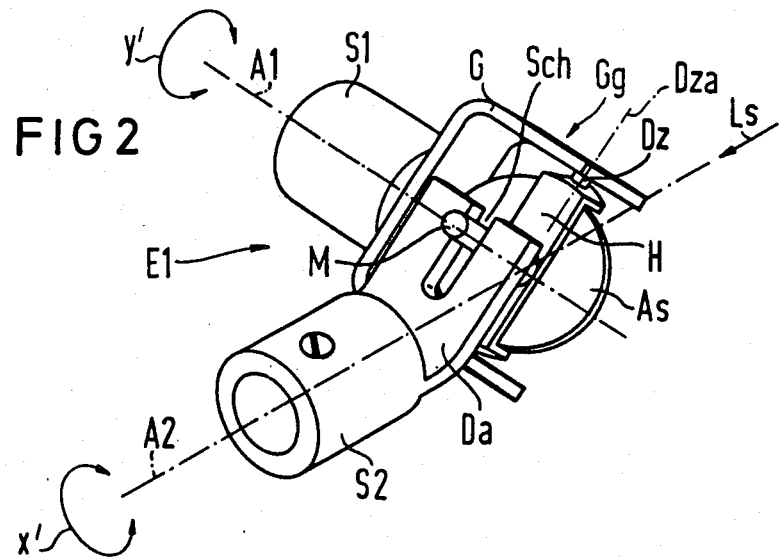
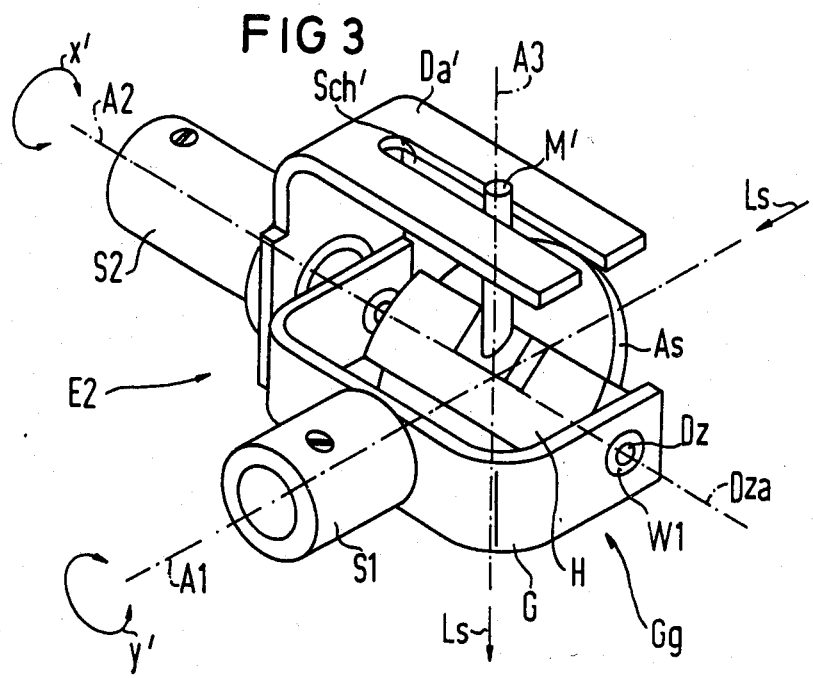

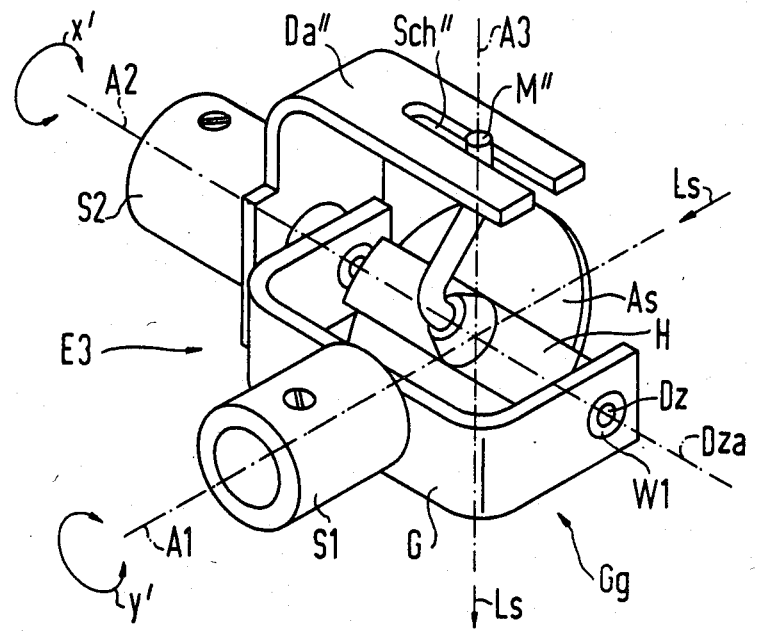
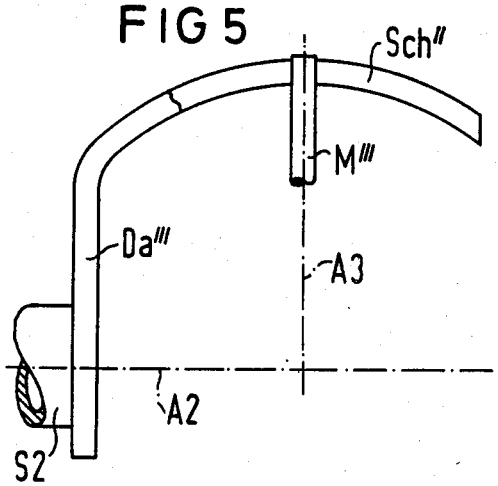
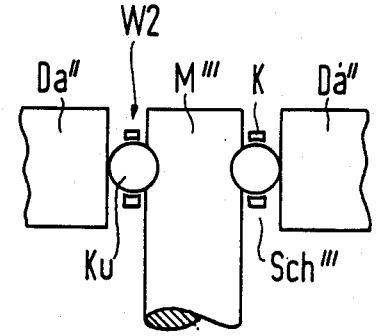

APPARATUS FOR THE DEFLECTION OF A LIGHT BEAM

BACKGROUND OF THE INVENTION

1. Field of the Invention

The invention relates to an apparatus for the deflection of a light beam in two mutually perpendicular directions whereby the deflection in each of the two directions is controllable independently of one another.

2. Description of the Prior Art

Such apparatus comprising a first deflection mirror for the horizontal deflection of the light beam generated by a laser and a second deflection mirror for the vertical deflection of the light beam are, for example, used in the laser scanning of a subject, in processing a workpiece with a laser beam and in particular, in laser labeling. In laser labeling, a photoshutter, the deflection mirrors controllable in accord with the labeling job and a lens which focuses the light beam onto the surface of a part to be labeled are disposed in succession in the beam path of a light beam generated by a laser. With the assistance of such an arrangement, parts of metal, ceramic, semiconductor materials and a multitude of plastics can then be labeled in accord with the labeling job with letters, numerals, marks, company symbols or graphic illustrations, whereby the labeling can be executed in engraving letter in fusing lettering or in evaporation lettering. Galvanometer mirrors having small, very light mirrors are thereby employed as deflection mirrors, these being distinguished by low moments of inertia and a low friction of the movable parts and, thus, allowing a high speed in the laser labeling.

U.S. Pat. No. 3,902,036 appears to show an apparatus for the deflection of a laser beam in two mutually perpendicular directions wherein only a single galvanometer mirror is disposed for the deflection in both directions. In the accompanying description, however, it is expressly emphasized that two galvanometer mirrors are employed in practice and that only one galvanometer mirror was illustrated only for the sake of simplifying the drawing.

SUMMARY OF THE INVENTION

An object of the invention is to create a simply constructed apparatus for the deflection of a light beam in two mutually perpendicular directions wherein high deflection speeds in both directions are enabled with only a single deflection mirror, being enabled by low moments of inertia and a low friction of the movable parts.

In accordance with the principles of the present invention this object is achieved by using two spindles whose axes are positioned perpendicular to each other and are hinged to a single deflection mirror. The first spindle is hinged to the mirror by a fork joint such that the trunnion axis of the fork joint and the axis of the first spindle are perpendicular to one another. The second spindle is hinged to the mirror by turning arm and a dog secured to the backside of the mirror. The dog is carried in the turning arm so as to be freely pivotable around the axis of the first spindle.

By using the apparatus of the invention, a single deflection mirror, modifying the known principle of cardanic suspension of a body, is seated such in a fork that it has two degrees of freedom for rotations and can be rotated via two spindles independently of one another. The first spindle thereby carries the fork, and the second spindle is hinged to the deflection mirror via a turning arm and a dog secured to the back side of the deflection mirror. In addition, however, the dog must also be guided so as to be freely pivotable in the turning arm around the axis of the first spindle since, otherwise, a mutually independent actuation of the two spindles would not be guaranteed. As a consequence of omitting the second deflection mirror which was hitherto required, an extremely simple and compact structure of the overall deflection apparatus results. Moreover, the movable parts of the deflection apparatus can be easily designed such that low moments of inertia and a low friction result and, thus, high deflection speeds can be achieved.

When an inventively designed deflection apparatus is employed in laser labeling, then further advantages derive due to the employment of a single deflection mirror. In comparison to known deflection devices comprising two deflection mirrors, the entrance pupil of the lens required for the focusing of the light beam can now be fixed to one point, this enabling the use of a simpler and less expensive lens. Further, the quality of the laser labeling is improved, since the geometrical distortions produced in deflection apparatus having two deflection mirrors due to the dislocation of the entrance pupil no longer occur.

In a preferred development of the invention, the reflecting surface in the initial position of the deflection mirror is inclined by an angle of about 45° relative to the axis of one of the two spindles. In view of the fact that, given an angle of inclination of 90°, a rotation of the corresponding spindle would not lead to any deflection of the light beam, such an angle of inclination of about 45° is to be considered optimum. When the trunnion axis of the fork joint is also additionally aligned plane-parallel to the reflecting surface of the deflection mirror, then given identical rotational angles of the two spindles, proportional deflection angles of the light beam can be achieved in the respective directions, whereby the proportional relationship between rotational angle of the spindle and deflection angle of the light beam in the one direction is twice as great as in the other direction and a simple compensation is enabled by means of a corresponding, electronic control of the drives.

In accord with a further development of the invention, the trunnions of the fork joint are secured to a support mount of the deflection mirror. The deflection mirror can then be glued to the support mount, this being particularly expedient for reducing the moments of inertia of the movable parts.

In view of the lowest possible friction of the movable parts, it is also expedient when the trunnions of the fork joint are seated in the fork of the fork joint via rolling bearings.

In a further, particularly preferred development of the invention, the dog is guided in a slot of the turning arm. Given a turning of the first spindle, the dog can then glide practically force-free in the longitudinal direction of the slot and, given a rotation of the second spindle, this rotation can be transmitted practically play-free onto the deflection mirror in cross-direction of the slot.

A particularly simple execution of the articulation of the second spindle to the deflection mirror is achieved in that the dog is aligned perpendicular to the reflecting surface of the deflection mirror and that the turning arm is inclined at an angle of about 45° relative to the axis of the second spindle.

The turning arm, however, can also be inclined by an angle of about 90° relative to the axis of the second spindle, whereby the slot is introduced into a leg of the turning arm aligned parallel to the axis of the second spindle. In this case, the dog can either be designed straight or can be aligned at an angle of about 45° relative to the reflecting surface of the deflection mirror or can be aligned in its fastening region perpendicular to the deflecting surface of the deflection mirror and can be inclined at an angle of about 45° relative to the reflecting surface of the deflection mirror by means of a two-fold bending in the region guided in the slot. In both modifications, thereby, a particularly high freedom of motion of the turning arm disposed offset by 90° relative to the fork of the fork joint in its initial position is guaranteed.

In view of the lowest possible friction between turning arm and dog it is also particularly beneficial when the slot proceeds around the axis of the first spindle in the form of a circular arc. As a result of this measure, a relative motion between turning arm and dog as seen in longitudinal direction of the dog can be completely prevented.

Further, it has proven particularly beneficial when the dog is formed of a cylindrical round rod. For reducing friction, the dog can then be seated in the slot in a particularly simple fashion via a rolling bearing.

In accord with another, preferred development of the apparatus of the invention, it is provided that the first spindle and the second spindle are rotatable by means of allocated or dedicated galvanometer drives. Such galvanometer drives are distinguished by a particularly high sensitivity and a particularly high precision. The galvanometer drives are then preferably applied to a housing which comprises a laser connection tube and a body tube aligned perpendicular thereto. By means of accomodating the entire deflection apparatus in such a housing, a particularly compact structural unit for laser labeling can then be obtained given corresponding completion with a laser and a lens.

BRIEF DESCRIPTION OF THE DRAWINGS

Exemplary embodiments of the invention shall be explained in greater detail below with reference to the drawings. Shown therein are:

FIG. 2, a first embodiment of an apparatus of the invention for the deflection of a light beam.

FIG. 3, a second embodiment of an apparatus of the invention for the deflection of a light beam.

FIG. 4, a third embodiment of an apparatus of the invention for deflection of a light beam.

FIG. 5, a modification of the turning arm employed in the apparatus of FIGS. 3 or 4.

FIG. 6, a roller bearing of the dog in the slot of the turning arm of FIG. 5.

DESCRIPTION OF THE PREFERRED EMBODIMENTS

Figure 1:
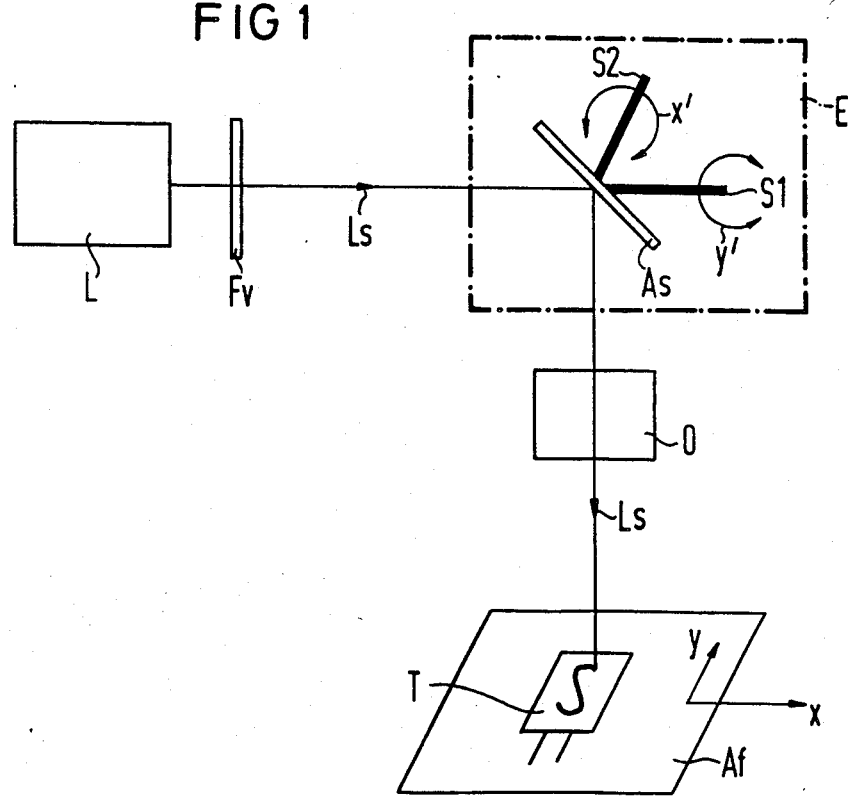
FIG. 1, the employment of an apparatus of the invention for the deflection of a light beam in laser labeling, shown in a greatly simplified schematic illustration.

FIG. 1 shows an apparatus for laser-labeling of a part T disposed on a work surface Af, this part T being a capacitor in the illustrated case. The apparatus comprises a laser L which generates a light beam Ls in whose beam path a photoshutter Fv, a means E for the deflection of the light beam Ls in two mutually perpendicular directions x and y and a lens O are disposed in succession, whereby the lens O focuses the light beam Ls onto the surface of the part T to be labeled. The apparatus E comprises a single deflection mirror as which deflects the light beam Ls in horizontal direction x and vertical direction y in accord with the respective labeling job, whereby the two deflection directions are defined by a planar cartesian x-, y-coordinate system indicated in the working surface Af. Two spindles S1 and S2 residing perpendicular to one another are hinged to the deflection mirror As, this, however, being only shown in a purely schematic fashion in FIG. 1. The first rotatable spindle S1 effects a deflection of the light beam Ls in the vertical direction y when it is rotated in the direction of the double arrow y′, whereas the second rotatable spindle S2 effects a deflection of the light beam Ls in the horizontal direction x when it is rotated in the direction of the double arrow x′.

The drives (not shown in FIG. 1) of the spindles S1 and S2 can, for example, be controlled by a process computer or by a microprocessor in accord with the respective labeling job, whereby the processor computer or microprocessor can also assume the control of the photoshutter Fv. As indicated in FIG. 1, the part T can, for example, be labeled with the letter "S" by corresponding rotations of the spindles S1 and S2.

FIG. 2 shows a perspective illustration of a first embodiment of an apparatus (referenced E1 overall) for the deflection of a light beam Ls. The first rotatable spindle S1 designed as a hollow shaft stub carries a fork G in which a mount H is rotatably seated via trunnion Dz. A circular deflection mirror AS has its back side glued to the mount H. The fork G and the mount H with the two trunnions Dz form a fork joint referenced Gg which is designed such that the axis A1 of the first spindle S1 and the trunnion axis Dza are perpendicular to one another.

The second rotatable spindle S2, likewise designed as a hollow shaft stub, is aligned such that its axis A2 is perpendicular to the axis A1 and goes precisely through the intersection of the axis A1 and the trunnion axis Dza. The hinging of the deflection mirror As to the second spindle S2 is accomplished by means of a turning arm Da and a dog M secured to the mount H of the deflection mirror As. The turning arm Da is a flat rod which has its front end rigidly connected to the second spindle S2 and is inclined at an angle of 45° to the axis A2 of the second spindle S2. A slot Sch open toward its front end is introduced into the turning arm Da, the center plane of said slot Sch lying in a plane proceeding through the axis A2. The dog M guided in the slot Sch is formed of a straight cylindrical round rod whose diameter is only slightly smaller than the width of the slot Sch. Moreover, the dog M is aligned such perpendicular to the reflecting surface of the deflection mirror As that its longitudinal axis proceeds through the common intersection of the axis A1, the axis A2 and the trunnion axis Dza.

The light beam Ls to be deflected is aligned such that, in the direction of the axis A2, it impinges the reflecting surface of the deflection mirror As in the intersection of the axes A1 and A2 and, in the initial position, is downwardly deflected by an angle of 90°. Given a rotation of the first spindle S1 in the direction of the double arrow y′, a corresponding excursion in y-direction derives (cf.

FIG. 1), whereby the dog M moves in the slot Sch without transmitting a torque onto the spindle S2. Given a rotation of the second spindle S2 in the direction of the double arrow x", a rotation of the deflection mirror As around the trunnion axis Dza with a corresponding excursion of the light beam Ls in x-direction (cf. FIG. 1) ensues via the turning arm Da and the dog M, whereby torque is likewise not transmitted to the spindle S1 in this operation either. A simultaneous turning of the spindles S1 and S2 leads to corresponding x, y curves in the plane of the working surface As (cf. FIG. 1).

FIG. 3 shows a perspective view of a second embodiment of an apparatus (referenced E2 overall) for the deflection of a light beam Ls. The hinging of the first spindle S1 to the deflection mirror As thereby ensues in the same way as in the first embodiment shown in FIG. 2, whereby, however, it can also be seen in FIG. 3 that the trunnions Dz are seated via roller bearings W1 in the fork G of the fork joint Gg. The two roller bearings W1 are so-called miniature ball-bearings having a radial play of less than 2 um.

The hinging of the second spindle S2 to the deflection mirror As ensues via a turning arm Da' and a dog M' secured to the mount H of the deflection mirror As. The turning arm Da' is an angled flat rod whose front end is rigidly connected to the second spindle S2 and is inclined in this fastening region by an angle of 90° relative to the axis A2. A slot Sch' open toward the front end is introduced into the leg of the turning arm Da' which proceeds parallel to the axis A2, the center plane of this slot lying in a plane proceeding through the axis A2. The dog M' conducted in the slot Sch' is formed of a straight cylindrical round rod whose diameter is only slightly smaller than the width of the slot Sch'. Moreover, the dog M' is aligned such at an angle of 45° relative to the reflecting surface of the deflection mirror As that its longitudinal axis A3 proceeds through the common intersection of the axis A1, the axis A2 and the trunnion axis Dza.

The light beam to be deflected is aligned such that, in the direction of the axis A2, it impinges the reflecting surface of the deflection mirror As in the intersection of the axis A1 and A2 and, in the initial position, is downwardly deflected by an angle of 90°. Rotations of the spindles S1 and S2 in the direction of the double arrows x' or y' leads to corresponding excursions of the light beam Ls in the x-direction or, respectively, in the y-direction (cf. FIG. 1).

FIG. 4 shows a perspective view of a third embodiment of an apparatus for the deflection of a light beam Ls which is referenced E3 overall. This third embodiment E3 largely corresponds to the second embodiment E2 shown in FIG. 3. The single difference is in the shape of the dog M" which is conducted in the slot Sch" of the turning arm referenced Da" here. The dog M" formed of a cylindrical round rod is aligned perpendicular to the reflecting surface in the region of its fastening to the mount H of the deflection mirror As and is doubly bent such that its region conducted in the slot Sch" is inclined at an angle of 45° relative to the reflecting surface of the deflection mirror As. In its region conducted in the slot Sch", the longitudinal axis A3 of the dog M" proceeds such that its extension proceeds through the common intersection of the axis A1, the axis A2 and the trunnion axis Dza. For the rest, the manner of functioning of the third apparatus E3 shown in FIG. 4 corresponds to that of the second apparatus E2 shown in FIG. 3.

FIGS. 5 and 6 show a modification having a particularly low-friction guidance of a dog referenced M'''' in the slot Sch''' of a turning arm referenced Da'''. The leg of the turning arm Da''' is bent off such in accord with FIG. 5 that the slot Sch''' proceeds in a circular arc around the axis A1 which is not shown here (cf. FIGS. 3 and 4). This axis A1 proceeds perpendicular to the plane of the drawing through the intersection of the axis A2 of the first spindle S1 and the axis A3 of the dog M''''. As a consequence of the course of the slot Sch''' in the shape of a circular arc, no frictional forces between the dog M'''' and the turning arm Da''' acting in longitudinal direction of the axis A3 occur given a rotation of the first spindle S1 (cf. FIGS. 3 and 4). The frictional forces acting perpendicular to the axis A3 can, in accord with FIG. 6, be reduced by a rolling bearing W2. The balls Ku of the rolling bearing W2 held in a cage K roll off on the outside at the wall of the slot Sch''' and, at the inside, at an all round groove of the dog M''''. The radial play of the rolling bearing W2 thereby amounts to less tham 2 $\mu$m.

Figure 7:
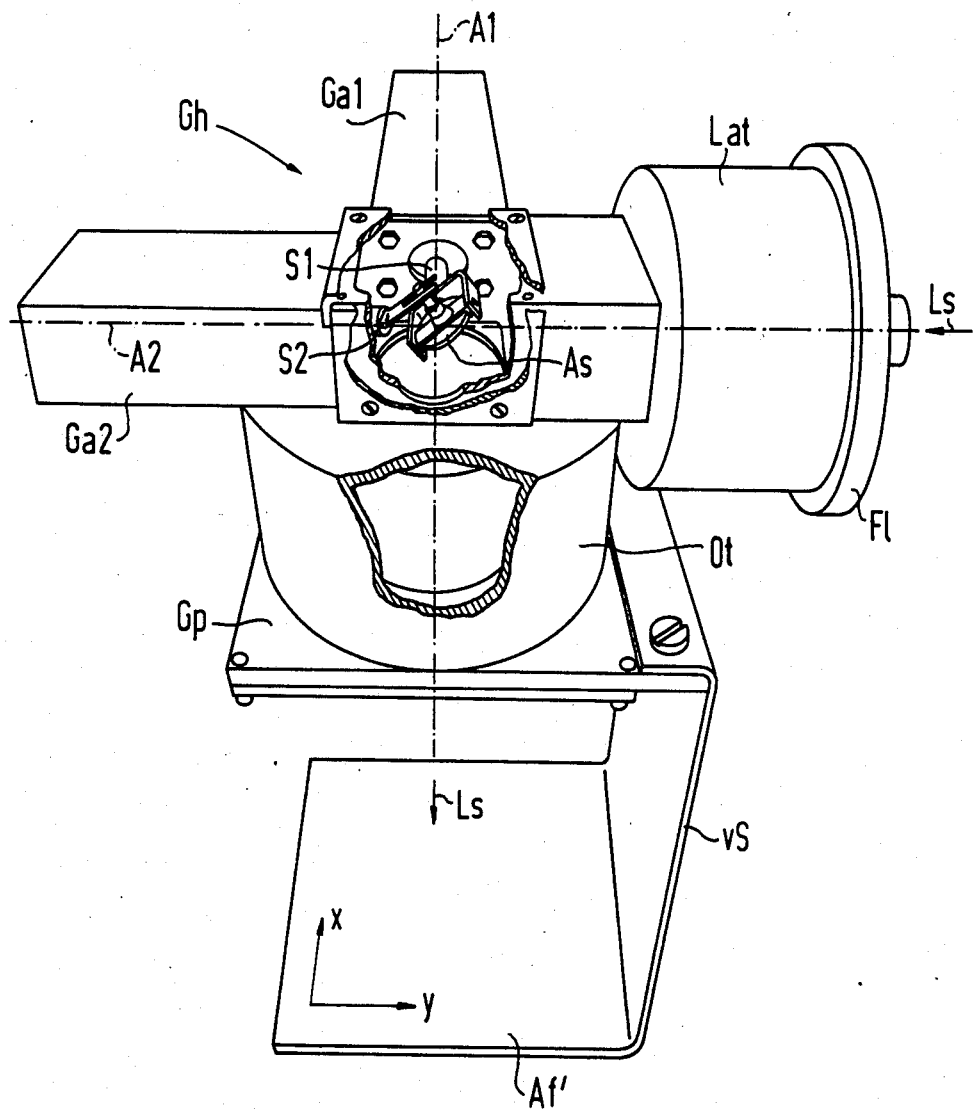
FIG. 7, the arrangement of an apparatus of FIG. 2 in a structural unit for laser labeling.

In a perspective illustration, FIG. 7 shows a structural unit for the laser labeling in whose housing referenced Gh the apparatus E2 illustrated in FIG. 2 is integrated. The first spindle D1 is connected to a galvanometer drive Ga1 flanged to the housing Gh, whereas the second spindle S2 is connect to a galvanometer drive Ga2 which is likewise flanged to the housing Gh. The housing Gh also comprises a laser connection tube Lat and an objective (body) tube Ot. The laser connection tube Lat carries a flange F1 to which a laser can be secured. The light beam Ls generated by this laser is then incident in the direction of the axis A2 on the deflecting mirror As and is deflected by this through the objective (body) tube Ot and the lens disposed therein onto the working surface referenced Af', this being connected via a vertical leg Vs to the horizontal base plate Gp of the objective (body) tube Ot. On the basis of the actuation of the galvanometer drives Ga1 and Ga2, this actuation being controlled, for example, by a microprocessor, the light beam Ls is then deflected in y-direction and in x-direction in accord with the respective labeling job.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. An apparatus for the deflection of a light beam in two mutually perpendicular directions, whereby said deflection in each of said two directions is controllable independently of one another by the rotation of a spindle connected to a deflecting mirror, comprising:

two spindles having axes residing perpendicular to one another are hinged to a single deflection mirror;

the first spindle is hinged to said deflection mirror via a fork joint, whereby the trunnion axis of said fork joint and the axis of said first spindle reside perpendicular to one another;

said second spindle is hinged to the deflection mirror via a turning arm and via a dog secured to the backside of the deflection mirror;

said dog is conducted in said turning arm so as to be freely pivotable around the axis of said first spindle.

2. An apparatus according to claim 1, wherein the reflecting surface in an initial position of the deflection mirror is inclined at an angle of roughly 45° to the axis of one of the two spindles.

3. An apparatus according to claim 1, wherein the trunnion axis of said fork joint is aligned parallel to the plane of the reflecting surface of said deflection mirror.

4. An apparatus according to claim 3, wherein the trunnions of said fork joint are secured to a mount of said deflection mirror.

5. An apparatus according to claim 1, wherein said trunnions of said fork joint are seated via rolling bearings in the fork of said fork joint.

6. An apparatus according to claim 1, wherein said dog is formed of a cylindrical round rod.

7. An apparatus according to claim 1, wherein said first spindle and said second spindle are rotatable by means of allocated galvanometer drives.

8. An apparatus according to claim 7, wherein said galvanometer drives are attached to a housing which comprises a laser connection tube and an objective (body) tube aligned perpendicular thereto.

9. An apparatus for the deflection of a light beam in two mutually perpendicular directions, whereby said deflection in each of said two directions is controllable independently of one another by the rotation of a spindle connected to a deflecting mirror, comprising:

two spindles having axes residing perpendicular to one another are hinged to a single deflection mirror;

the first spindle is hinged to said deflection mirror via a fork joint, whereby the trunnion axis of said foek joint and the axis of said first spindle reside perpendicular to one another;

said second spindle is hinged to the deflection mirror via a turning arm and via a dog secured to the backside of the deflection mirror;

said dog is conducted in said turning arm by being guided in a slot of said turning arm so as to be freely pivotable around the axis of said first spindle.

10. An apparatus according to claim 9, wherein said dog is aligned perpendicular to said reflecting surface of said deflection mirror; and in that said turning arm is inclined at an angle of roughly 45° relative to the axis of said second spindle.

11. An apparatus according to claim 9, wherein said turning arm is inclined at an angle of about 90° relative to the axis of said second spindle and in that said slot is introduced into a leg of said turning arm aligned parallel to the axis of said second spindle.

12. An apparatus according to claim 11, wherein said dog is designed straight and is aligned at an angle of about 45° relative to said reflecting surface of said deflection mirror.

13. An apparatus according to claim 11, wherein said dog is aligned in its fastening region perpendicular to said reflecting surface of said deflection mirror and, on the basis of a double bend in the region guided in said slot is inclined at an angle of about 45° relative to said reflecting surface of said deflection mirror.

14. An apparatus according to claim 9, wherein said slot proceeds in the shape of a circular arc around the axis of said first spindle.

15. An apparatus according to claim 9, wherein said dog is seated in said slot via a rolling bearing.

16. An apparatus for the deflection of a light beam in two mutually perpendicular directions comprising:

a first spindle rotatable about a first axis;

a second spindle rotatable about a second axis perpendicular to said first axis;

a single deflection mirror hinged to said first spindle and said second spindle for independent movement by each spindle;

said spindles being hinged to said mirror such that a spatial position of each spindle is not influenced by rotation of the other spindle.

17. An apparatus according to claim 16, wherein said first spindle is hinged to said mirror by means of a joint comprising a rotatable trunnion held in a fork, said trunnion rotatable about an axis perpendicular to said first axis.

18. An apparatus according to claim 17, wherein said second spindle is hinged to said mirror by means of a joint comprising a turning arm attached to said spindle and a dog attached to said mirror, said dog movably captured by said turning arm so as to be freely pivotable around said first axis.

19. An apparatus for the deflection of a light beam in two mutually perpendicular directions comprising:

a single deflection mirror;

a first means for rotating said mirror about a first axis;

a second means for rotating said mirror about a second axis perpendicular to said first axis;

rotation of said mirror by said first means having no effect on a satial position of said second means, and rotation of said mirror by said second means having no effect on a spatial position of said first means;

whereby rotation about each axis is accomplished independently.

* * * * *